United States Patent [19]

Zuber et al.

[11] Patent Number: 4,491,475
[45] Date of Patent: Jan. 1, 1985

[54] CONSTANT RATE BRIQUETTE FEEDING SYSTEM

[75] Inventors: Chester L. Zuber, Evansville; Virgil T. Butrum, Boonville, both of Ind.; Jeffrey B. Gorss, Wexford, Pa.; Manford E. Rydholm, Newburgh, Ind.

[73] Assignee: Aluminum Company of America, Pittsburgh, Pa.

[21] Appl. No.: 578,227

[22] Filed: Feb. 8, 1984

[51] Int. Cl.$^3$ ............................................. C22B 21/00
[52] U.S. Cl. .................................. 75/65 R; 75/68 R; 266/91; 266/200; 266/901
[58] Field of Search .................... 266/200, 901, 91; 75/65 R, 68 R, 44 R, 44 S

[56] References Cited

U.S. PATENT DOCUMENTS

| | | | |
|---|---|---|---|
| 3,247,555 | 4/1966 | Keating | 266/200 |
| 3,758,267 | 9/1973 | Berk | 266/901 |
| 4,322,245 | 3/1982 | Claxton | 75/68 R |
| 4,394,166 | 7/1983 | Kennedy | 75/65 R |

FOREIGN PATENT DOCUMENTS 0004408  1/1977  Japan ................................ 75/68 R Primary Examiner—M. J. Andrews
Attorney, Agent, or Firm—Andrew Alexander

[57] ABSTRACT

A method of charging relatively large briquettes of metal scrap to a melting system at a substantially constant feed rate is disclosed. The method comprises providing a pumping bay, a charging and melting bay, and a molten metal furnace from which molten metal is recirculated from the furnace through the pumping bay to the charging and melting bay. The briquettes are transferred onto a first conveyor adapted to store and convey a controlled weight of briquettes to a second conveyor. The briquettes are conveyed from the first conveyor to a second conveyor mounted on load cells which intermittently stops the first conveyor to maintain a controlled weight in the second conveyor. The briquettes are transferred from the second conveyor to a third conveyor where they are aligned and accumulated. The briquettes are then discharged individually at a substantially constant rate into the melting bay.

9 Claims, 6 Drawing Figures

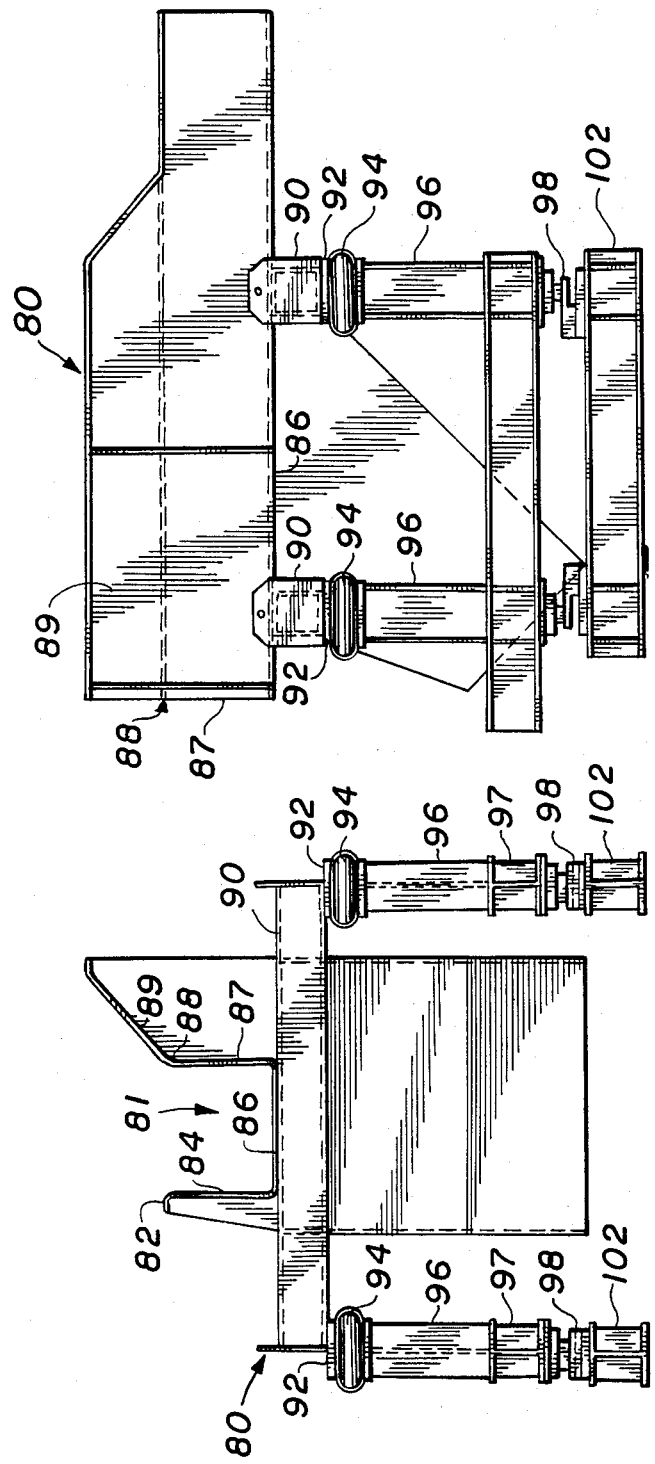

CONSTANT RATE BRIQUETTE FEEDING SYSTEM

INTRODUCTION

This invention relates to scrap reclamation and in particular to a method of providing a constant feed rate of relatively large briquettes of metal scrap to a melting system.

In scrap recycling systems, different types of scrap are encountered and each type can pose certain problems or difficulties, particularly when it is attempted to recycle the scrap efficiently. For example, U.S. Pat. No. 4,128,415, incorporated herein by reference, refers to aluminum scalping chips and used container scrap and notes the particular problems which can be encountered with flowable and nonflowable scrap. However, for convenience of handling skeleton scrap (which is comprised mainly of sheet which remains when shapes such as can ends and parts are stamped therefrom), normally it is baled or formed into briquettes or cubes which range from 4 to about 28 inches on a side. Typically, such aluminum briquettes are loaded and strapped with steel straps to pallets for ease of handling. However, even though baling and strapping facilitates handling to some extent, it seriously impedes reclamation and re-melting of such scrap. That is, heretofore, charging of the briquettes has practically necessitated individual handling of each briquette for purposes of transferring it to a melting bay. Or, if a pallet of briquettes was charged to a melting hearth, there resulted a high level of skim and loss of metal during melting which was often accompanied with high iron levels in the melt resulting from the iron straps. Accordingly, for purposes of economics with respect to handling and obtaining a grade of aluminum melt which did not require re-alloying or large dilution with higher purity and more costly aluminum, a method for charging the briquettes to a melting bay was required. That is, a method was required which would permit a substantially constant rate of addition of briquettes or bales to an aluminum melting bay which would not result in great amounts of skim or dross generation. The present invention provides a new method of handling and feeding bales or briquettes of such scrap with the beneficial results noted above.

SUMMARY OF THE INVENTION

An object of this invention is to provide an efficient method for reclaiming metal scrap.

Another object of this invention is to provide an effective method for handling and feeding briquettes of metal scrap to a melting bay.

Yet another object of the present invention is to provide a method for handling large quantities of relatively large bales or briquettes of aluminum scrap and charging such briquettes individually into a melting bay at a substantially constant feed rate.

And yet a further object of this invention is to provide a method for melting briquettes of aluminum which results in reduced dross or skim generation.

These and other objects will become apparent from a reading of the disclosure and claims and an inspection of the drawings appended hereto.

In accordance with these objects, there is provided a method of charging relatively large briquettes of metal scrap to a melting system at a substantially constant feed rate and at a greatly reduced skim generation rate. The method comprises providing a pumping bay, a charging and melting bay, and a molten metal furnace from which molten metal is recirculated from the furnace through the pumping bay to the charging and melting bay. The briquettes are transferred onto a first conveyor adapted to convey a controlled weight of the briquettes to a second conveyor. The briquettes are conveyed along the first conveyor and transferred in controlled amounts or weights to a second conveyor and after the second conveyor has received the controlled weight, the first conveyor is intermittently stopped to maintain the controlled weight on the second conveyor. The briquettes are moved along the second conveyor to a third conveyor where they are aligned and accumulated and individually charged at a substantially constant rate into the melting bay.

BRIEF DESCRIPTION OF THE DRAWINGS

FIG. 4 is a cross-sectional view along line A—A of FIG. 5.

FIG. 5 is an elevational view of a secondary conveyor for receiving briquettes of scrap from the primary feeder.

DETAILED DESCRIPTION OF THE PREFERRED EMBODIMENTS

Figure 1:
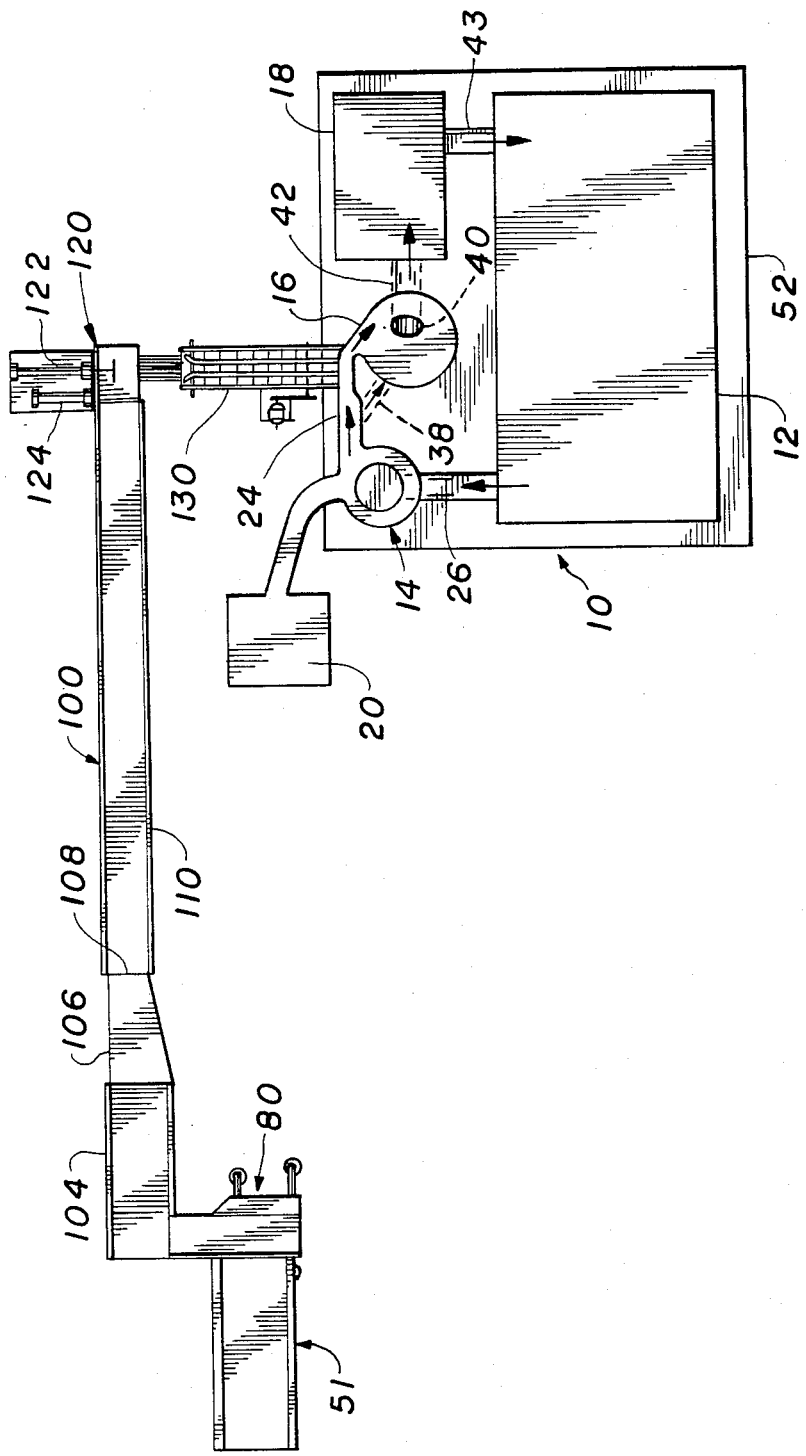
FIG. 1 is a plan view showing a general schematic of a recirculating melting system for melting relatively large briquettes in accordance with the invention.

Referring now more specifically to FIG. 1, there is shown a schematic of a recirculating melting system 10 incorporating the present invention. In the recirculating melting system, melting media is recirculated from heating bay 12 along line 26 by pumping mechanism 14. Molten melting media is forwarded along line 24 to charging and melting bay 16. Thereafter, molten material exits through conduit 42 into skim removal or fluxing bay 18 before being returned along line 43 to heating bay 12. At pumping station 14, excess molten metal may be removed to a holding furnace 20.

The melting media may be heated in heating bay 12 by combustion units discharging their heat upon its surface. Alternatively, electric induction or resistance heaters immersed in the molten media may be used.

The melting media can be molten media of similar composition to the metal charge or it may be molten salt. If a salt is used, a salt-metal separation would normally be necessary to facilitate removal of the melted metal. When molten aluminum is the melting media, a typical temperature leaving the heating bay 12 is about 1400° F. although this temperature can range from 1325° to 1475° F. Thus, a temperature drop is provided across the charge and melting bay to provide heat to melt the charge.

For purposes of feeding bales or briquettes of metal scrap, e.g. aluminum scrap, there is shown a plan view in FIG. 1 of a system which is capable of handling a large number of briquettes yet provides for a constant feed rate of briquettes to melting bay 16. Thus, for purposes of handling large numbers of briquettes in this fashion, there is shown in FIG. 1 a primary or loading conveyor 51.

Figure 3:
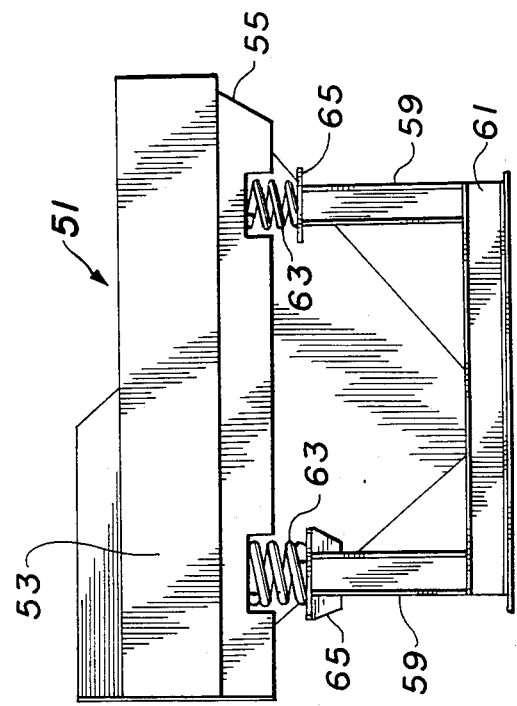
FIG. 3 is an elevational view of a primary accumulating feeder in accordance with the invention.
Figure 2:
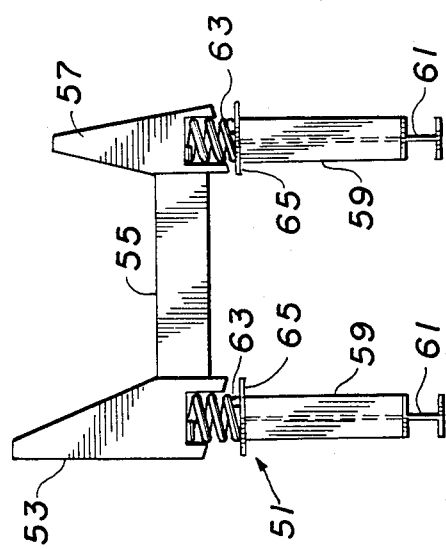
FIG. 2 is a cross-sectional view along line A—A of FIG. 3 of a system for feeding briquettes thereto in accordance with the present invention.

FIG. 2 shows a cross-section of primary feeder 51 for briquettes. Feeder 51, as shown in FIG. 2 is generally trough shaped and comprises a back member 53, a bottom member 55 and a front member 57 which is capable of containing large numbers of briquettes. Feeder 51 is mounted on legs 59 which are carried on members 61. Feeder 51 is carried on legs 59 by means of spring members 63 which have a bottom end thereof fastened to plate 65 which is mounted on top of legs 59. The top of spring members 63 is contained and fastened in walls 53 and 57 substantially as shown in FIGS. 2 and 3. Springs 63 permit feeder 51 to be vibrated or oscillated to feed briquettes to a secondary metering feeder referred to generally as 80, the feeder being vibrated by means of a hydraulic system (not shown) which is controlled by secondary metering feeder 80, as will be explained hereinbelow.

Secondary metering feeder 80 is shown in FIGS. 4 and 5 with FIG. 4 being a cross-section along line A—A of FIG. 5. As shown in FIG. 4, secondary feeder 80 has a generally trough shaped configuration 81 having a top or front portion 82, a side 84, bottom 86 and back portion 88 which has a substantially vertical portion 87 and a sloping portion 89. From FIG. 1, it will be seen that secondary metering feeder 80 is located at about 90° with respect to primary feeder 51; however, it will be understood that this is the preferred arrangement and other locations or angles with respect to each other are contemplated within the invention. In the arrangement shown in FIG. 1, sloping portion 89 is arranged so as to be located opposite the primary feeder. In this way, briquettes may be conveyed onto the secondary feeder and yet prevented from being pushed off the conveying system.

In secondary metering system 80, trough 81 is supported by members 90 which have plates 92 attached thereto. Plates 92 are in turn supported by air or gaseous filled containers 94 which may be fabricated from rubber type material which function as springs in much the same fashion as the springs in the primary feeder. That is, containers 94 permit trough 81 to vibrate or shake so as to move the briquettes or bales of scrap in the direction of main conveyor 100.

Containers 94 are carried by support members 96 and 97 which in turn are placed on load cells 98 which are carried on base 102. Load cells 98 are connected through a controller to a solenoid (not shown) so as to operate or stop operation of primary feeder 51, depending on the weight of briquettes of scrap carried on the secondary feeder. That is, if an insufficient quantity of briquettes is located on the secondary feeder, the load cells activates the primary feeder and adds sufficient briquettes to satisfy the load requirements of the secondary feeder, at which time the load cells deactivate the primary feeder.

Figure 6:
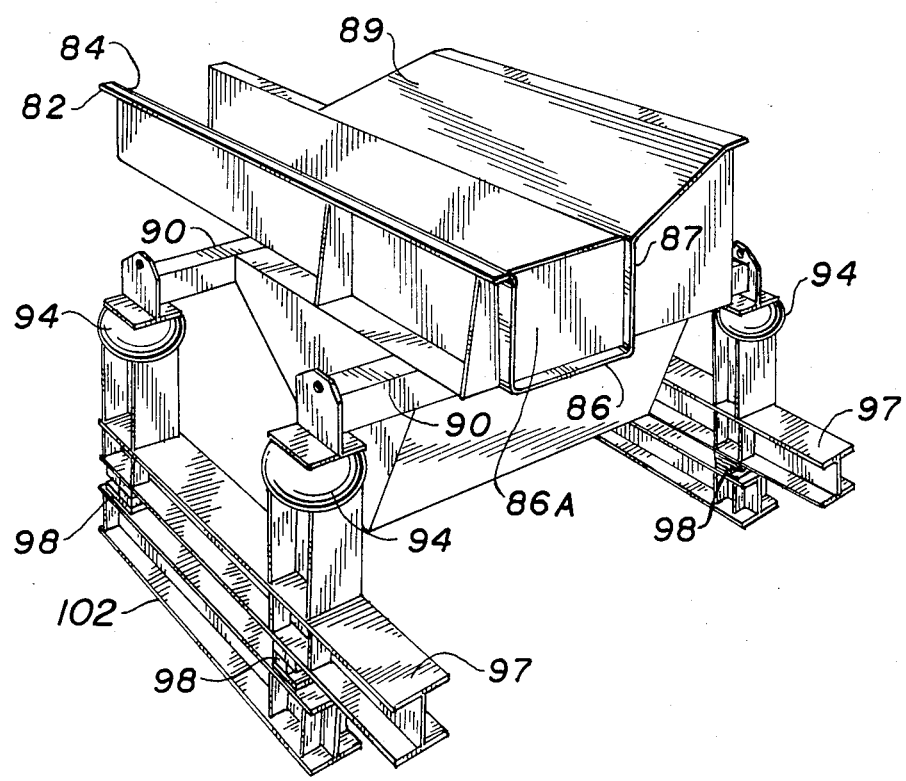
FIG. 6 is a dimensional view of the secondary conveyor shown in FIGS. 4 and 5.

With respect to trough 81 of the secondary metering or feeding conveyor, preferably the width of the bottom is sufficient to accommodate about the width of three briquettes. Thus, it can be seen that the conveying system starts the initial arranging of the cubes of scrap as it moves them towards the end of the conveyor in order to obtain a constant feed rate to a melting system. Further, it will be appreciated that sloping portion 89 (FIGS. 4 and 6) urges cubes down into the trough as the feeder system vibrates.

The vibrating action of the secondary metering feeder transfers cubes or briquettes of scrap on to transfer conveyor 100 at end 104 thereof. The briquettes at this stage preferably are only one layer thick or deep. Thus, it will be appreciated that at this point of the process an unorganized number or pile of briquettes has been organized into a single layer. As the briquettes move along portion 104 of transfer conveyor 100, they are urged into single file by narrowing portion 106. End 108 of portion 106 is only sufficiently wide to accommodate or permit passage of a single briquette. After entering portion 110 of transfer conveyor 100, the briquettes move in single file along portion 110 to a push-off section referred to generally as 120. It will be noted that the cubes can be moved along transfer conveyor 100 by vibrating action in much the same manner as described above. However, even though reference has been made heretofore only to vibratory or shaker conveyors, other types of conveyors, such as belt or chain conveyors, are contemplated within the purview of the invention.

For purposes of ensuring a constant feed rate of briquettes to melting bay 16, push-off section 120 is comprised of a ram 122 which is timed or programmed to push a briquette off transfer conveyor 100 at a controlled rate. It will be appreciated that this rate can be increased or decreased in accordance with the requirements of melting bay 16. Ram 122 may be hydraulically activated. For purposes of ensuring that only a single briquette is removed from transfer conveyor 100, a second ram 124 may be used to stop or control the flow of briquettes to ram 122 by retaining them while the briquette already in place is discharged. Thus, it will be appreciated that both rams can be controlled and synchronized to ensure a constant flow rate of briquettes to melting bay 16.

Referring further to FIG. 1, it will be noted that an elevator 130 is shown. Elevator 130 receives the briquettes and carries them to melting bay 16. The use of elevator 130 can be optional and would only be used when melting bay 16 is located above transfer conveyor 100. Further, transfer conveyor 100 and melting bay 16 may be located sufficiently close to permit ram 122 to push the briquette directly into the melting bay. The present continuous system of melting briquettes has the advantage that the amount of iron encountered can be significantly lowered, e.g. 0.45 wt. % Fe or less compared to 0.6 wt. % Fe or higher for a batch system where approximately 13,000 pounds of briquettes are placed in a charging or melting bay at one time, the reduction in iron being largely due to the present system permitting the removal of steel straps prior to melting. The present system has a further advantage in that the melting rate can be substantially increased, e.g. more than doubled, with a decrease in melt loss due to formation of dross. Lastly, the present system can provide as much as 10 to 15% increase in fuel efficiency with respect to melting of the briquettes.

While the invention has been described in terms of preferred embodiments, the claims appended hereto are intended to encompass other embodiments which fall within the spirit of the invention.

What is claimed is:

1. A method of charging relatively large briquettes of metal scrap to a melting system at a substantially constant feed rate, the method comprising the steps of:

(a) providing a pumping bay, a charging and melting bay, and a molten metal furnace from which molten metal is recirculated from said furnace through the pumping bay to said charging and melting bay;
(b) providing a relatively large quantity of said briquettes for introducing at a substantially constant rate to said charging and melting bay;
(c) transferring said large quantities of briquettes onto a first conveyor adapted to contain said large quantities and to convey a controlled weight of said briquettes to a second conveyor;
(d) conveying said briquettes along said first conveyor and transferring said controlled weight of briquettes to said second conveyor;
(e) after said second conveyor has received said controlled weight of briquettes, intermittently stopping and starting said first conveyor to maintain said controlled weight on said second conveyor;
(f) moving said briquettes on said second conveyor to a third conveyor where they are aligned and accumulated for charging into a melting bay; and
(g) charging individual briquettes at a constant feed rate from said third conveyor into said melting bay.

2. The method according to claim 1 wherein said first conveyor is a vibrating conveyor.

3. The method according to claim 1 wherein said briquettes contain aluminum scrap.

4. The method according to claim 1 wherein said first conveyor has a generally U-shaped cross-sectional configuration.

5. The method according to claim 1 wherein said secondary conveyor utilizes a weighing means connected to a switch for stopping and starting said first conveyor.

6. The method according to claim 1 including providing said second conveyor with a sloped rear wall for urging said briquettes into said second conveyor.

7. The method according to claim 1 including urging said briquettes on said second conveyor into a single layer on said second conveyor just prior to their being transferred onto a third conveyor.

8. The method according to claim 1 including aligning said briquettes on said third conveyor into single file.

9. The method according to claim 1 including discharging briquettes from said third conveyor one at a time to provide said constant feed rate to said melting bay.

* * * * *